United States Patent
Kinney, Jr.

(10) Patent No.: US 10,402,227 B1
(45) Date of Patent: Sep. 3, 2019

(54) TASK-LEVEL OPTIMIZATION WITH COMPUTE ENVIRONMENTS

(71) Applicant: Amazon Technologies, Inc., Seattle, WA (US)

(72) Inventor: James Edward Kinney, Jr., Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 55 days.

(21) Appl. No.: 15/253,699

(22) Filed: Aug. 31, 2016

(51) Int. Cl.
| | |
|---|---|
| G06F 9/46 | (2006.01) |
| G06F 9/50 | (2006.01) |
| G06F 9/48 | (2006.01) |
| H04L 12/911 | (2013.01) |

(52) U.S. Cl.
CPC .......... G06F 9/5011 (2013.01); G06F 9/4881 (2013.01); H04L 47/70 (2013.01)

(58) Field of Classification Search
CPC ....... G06F 9/5011; G06F 9/4881; H04L 47/70
See application file for complete search history.

(56) References Cited

U.S. PATENT DOCUMENTS

| | | | |
|---|---|---|---|
| 6,996,502 B2* | 2/2006 | De La Cruz | G06F 9/465 702/188 |
| 7,356,770 B1 | 4/2008 | Jackson | |
| 7,810,099 B2 | 10/2010 | Dettinger et al. | |
| 8,286,176 B1* | 10/2012 | Baumback | G06F 9/5061 709/221 |
| 8,355,316 B1* | 1/2013 | Lushear | H04L 43/0817 370/217 |
| 8,793,365 B2 | 7/2014 | Arsovski et al. | |
| 8,990,820 B2 | 3/2015 | Plancarte et al. | |
| 9,043,788 B2* | 5/2015 | Garrett | G06F 11/3414 718/1 |
| 9,235,446 B2 | 1/2016 | Bruno et al. | |
| 9,239,996 B2 | 1/2016 | Moorthi et al. | |
| 9,454,321 B1* | 9/2016 | Smaldone | G06F 3/061 |
| 2003/0061324 A1* | 3/2003 | Atherton | G06F 11/3409 709/223 |
| 2003/0135609 A1* | 7/2003 | Carlson | G06F 9/5011 709/224 |
| 2004/0230670 A1* | 11/2004 | Schmidt-Karaca | H04L 41/0816 709/220 |

(Continued)

OTHER PUBLICATIONS

"Slurm version 16.05 Quick Start User Guide," Mar. 2016, downloaded from Source: http://slurm.schedmd.com/quickstart.html, pp. 1-7.

*Primary Examiner* — Adam Lee
(74) *Attorney, Agent, or Firm* — Robert C. Kowert; Meyertons, Hood, Kivlin, Kowert & Goetzel, P.C.

(57) ABSTRACT

Methods, systems, and computer-readable media for task-level optimization of compute environments are disclosed. Execution is initiated of one or more tasks using a plurality of computing resources provisioned from a multi-tenant provider network. At least some of the computing resources vary in configuration. One or more metrics are determined that are associated with the execution of the one or more tasks. A configuration of the computing resources is selected based at least in part on the one or more metrics. A modified job definition associated with the one or more tasks is generated. The modified job definition indicates the selected configuration.

15 Claims, 11 Drawing Sheets

(56) References Cited

U.S. PATENT DOCUMENTS

| | | | |
|---|---|---|---|
| 2005/0125512 A1* | 6/2005 | Fuller, III | G06F 9/44505 709/220 |
| 2006/0047793 A1* | 3/2006 | Agrawal | H04L 41/0843 709/221 |
| 2007/0255830 A1* | 11/2007 | Alt | G06Q 10/06 709/226 |
| 2008/0071939 A1* | 3/2008 | Tanaka | G06F 11/3419 710/18 |
| 2009/0006519 A1* | 1/2009 | Nandan | G06F 8/60 709/200 |
| 2011/0022870 A1* | 1/2011 | McGrane | G06F 1/3203 713/340 |
| 2012/0124363 A1* | 5/2012 | Dietrich | G06F 11/3442 713/100 |
| 2012/0254436 A1* | 10/2012 | Bihani | G06F 9/06 709/226 |
| 2013/0080619 A1* | 3/2013 | Assuncao | G06F 9/45558 709/224 |
| 2013/0144997 A1* | 6/2013 | Kim | H04L 29/12009 709/221 |
| 2014/0047107 A1* | 2/2014 | Maturana | H04L 43/04 709/224 |
| 2014/0165136 A1* | 6/2014 | Ozawa | H04L 41/0873 726/1 |
| 2014/0280805 A1* | 9/2014 | Sawalha | G06F 9/5072 709/222 |
| 2014/0337429 A1* | 11/2014 | Asenjo | H04L 65/403 709/204 |
| 2015/0039716 A1* | 2/2015 | Przykucki, Jr. | H04L 67/1097 709/214 |
| 2015/0120938 A1* | 4/2015 | Mordani | H04L 41/5041 709/226 |
| 2015/0134618 A1* | 5/2015 | Teterin | G06F 11/1456 707/654 |
| 2015/0169383 A1* | 6/2015 | van den Berghe | G06F 9/5094 718/104 |
| 2015/0244581 A1* | 8/2015 | Angaluri, Sr. | H04L 41/0823 709/224 |
| 2015/0304117 A1* | 10/2015 | Dong | H04L 12/185 370/312 |
| 2015/0317189 A1* | 11/2015 | Georgescu | G06F 9/50 718/104 |
| 2016/0048791 A1* | 2/2016 | Kadakia | G06Q 10/06316 705/7.26 |
| 2016/0378076 A1* | 12/2016 | Hill | G05B 13/026 700/28 |

\* cited by examiner

TASK-LEVEL OPTIMIZATION WITH COMPUTE ENVIRONMENTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. Such resources at data centers, when accessed by remote customers, may be said to reside "in the cloud" and may be referred to as cloud computing resources.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner. The use of virtualization with cloud computing resources to run client programs may enable some clients to access a much greater amount of computing capacity at a given time than would be possible with the clients' on-premises resources.

Figure 1:
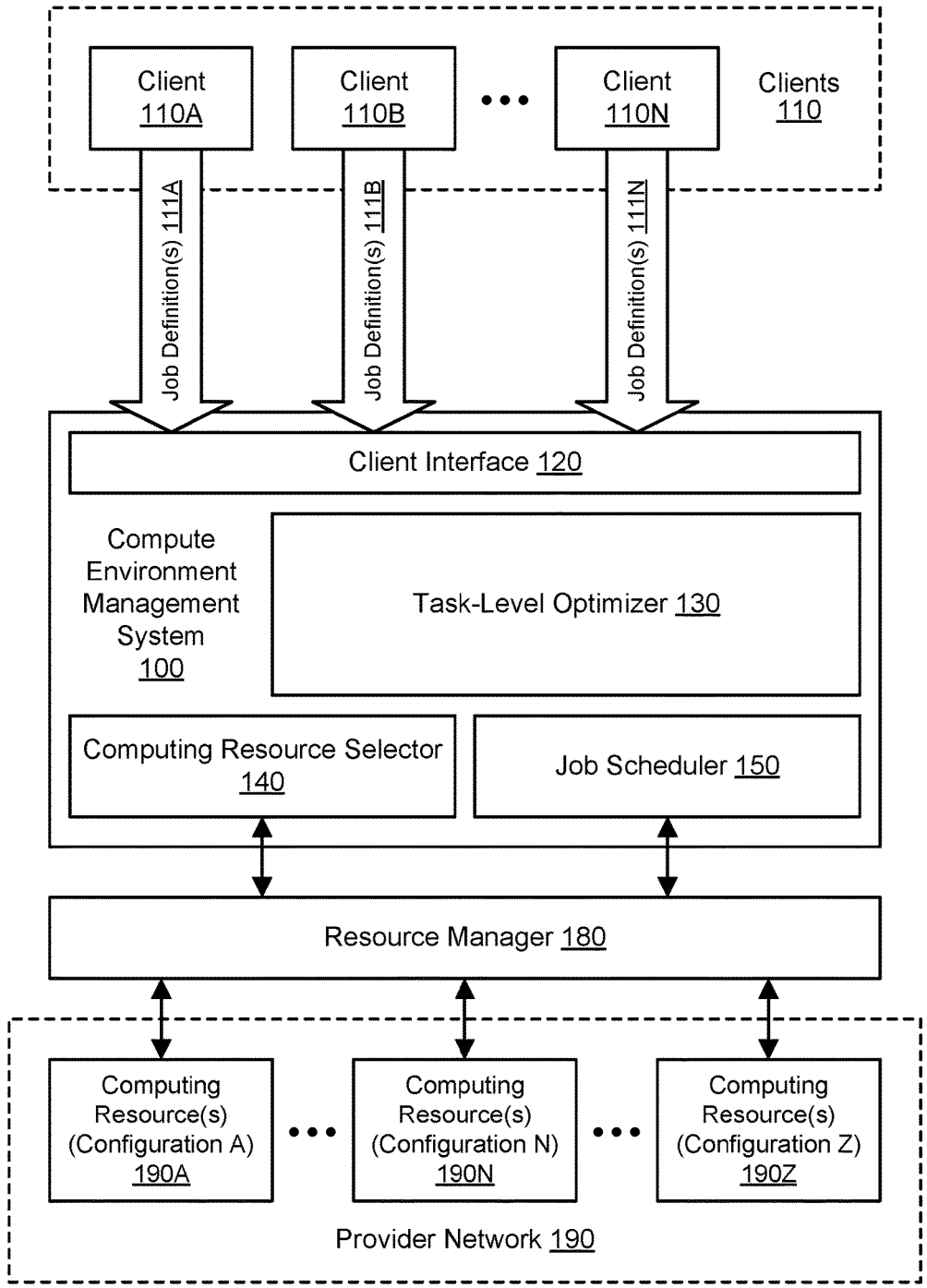
FIG. 1 illustrates an example system environment for task-level optimization with compute environments, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for task-level optimization with compute environments are described. Using the techniques described herein, different configurations of computing resources may be tested for execution of one or more tasks, and one or more of the configurations may be selected to optimize for characteristics such as cost and/or performance. The computing resources may be selected from a pool of available resources of a multi-tenant provider network. The resources may include compute instances, storage instances, and/or other types of instances. The instances may belong to different instance types, and the instance types may vary in terms of their hardware and/or software configuration. For example, compute instance types may vary in their computational characteristics (e.g., number of cores, computational power, chipset, presence or absence of a graphics processing unit, and so on) and/or memory characteristics (e.g., type and size of random-access memory). A job definition may be submitted that specifies one or more tasks, potentially including multiple copies of a given task with different inputs. A compute environment management system may deploy the task(s) to different compute environments, and the compute environments may include different configurations of the resources of the provider network. For example, one compute environment may include a set of compute instances of one hardware configuration, while another compute environment may include a set of compute instances of another hardware configuration. Execution of the task(s) in the different compute environments may be monitored, and metrics associated with the execution (e.g., cost and/or performance metrics) may be captured and analyzed. Based (at least in part) on the metrics, one or more of the tested configurations, or one or more characteristics thereof, may be selected as an optimal or recommended configuration for the one or more tasks. The optimal configuration may be selected to optimize for one or more characteristics related to performance and/or cost. The job definition may be modified to reflect the optimal configuration, such as by updating the processor or memory requirements in the job definition. In one embodiment, additional tasks (or copies of the same task(s)) may be deployed to a compute environment having the optimal configuration either automatically or upon approval by a client. In this manner, a compute environment may be optimized for execution of particular tasks.

FIG. 1 illustrates an example system environment for task-level optimization with compute environments, according to one embodiment. A compute environment management system 100 may manage various compute environments on behalf of clients. Based (at least in part) on information provided by clients, such as descriptions of computing resources to be used in compute environments and queues mapped to those environments, the compute environment management system 100 may automatically provision and deprovision computing resources for the compute environments. For example, within user-defined constraints, the compute environment management system 100 may automatically grow or shrink a particular compute environment to meet the requirements of jobs that the user expects to be executed in the environment. As described herein, the compute environment management system 100 may include task-level optimization as implemented (at least in part) by a task-level optimizer 130. The task-level optimizer 130 may test various configurations of computing resources for execution of particular tasks, determine recommended or optimal configurations for those tasks, and/or deploy the tasks to compute environments having the recommended or optimal configurations corresponding to the tasks.

The compute environment management system 100 may include a client interface 120 that permits interaction with the clients 110A-110N, e.g., such that the client can submit job definitions and potentially configuration information for compute environments. Using the client interface 120, the compute environment management system 100 may receive job definitions such as one or more job definitions 111A from client 110A, one or more job definitions 111B from client 110B, and one or more job definitions 111N from client 110N. One or more workloads of jobs may be received from a particular client device in one batch or in multiple batches over a period of time. The jobs may be defined by one or more job definitions. The job definitions may be received by the compute environment management system 100 through any appropriate client interface 120, potentially including one or more application programming interfaces (APIs), other programmatic interfaces, and/or user interfaces.

A job definition may describe one or more tasks to be performed by computing resources in the provider network 190. The tasks within a job definition may include entirely different tasks (e.g., tasks having different program code) and/or tasks that run the same program code for different input data. For a particular task, a job definition may include or reference program instructions to be executed in processing the task. The job definition may include or be associated with a job identifier. A job definition may include or reference a set of input data to be processed using the program instructions, potentially using multiple copies of an application or set of program code to process different elements of the input data sequentially or concurrently. A job definition may also include or be provided with other suitable metadata, including timing information (e.g., a time to begin processing the workload, an anticipated time to run the workload, and/or a deadline), budgetary information, anticipated resource usage, and so on. For example, the anticipated resource usage in a job definition may indicate one or more values (including a range of values) for anticipated processor usage (e.g., a number of virtual CPUs), memory usage, storage usage, network usage, and/or other hardware resource characteristics.

The client interface 120 may be used for receipt of other input from clients 110A-110N; the input may represent user input and/or input generated programmatically. For example, the input may specify or reference one or more constraints and/or one or more queue identifiers for a particular compute environment. Based (at least in part) on the input, the compute environment management system 100 may generate a compute environment specification for a compute environment associated with a particular client 110A. The compute environment management system 100 may then manage, on behalf of the client, resources in a compute environment consistent with the specification. Alternatively, the compute environment management system 100 may permit the client to perform management of computing resources within a compute environment, potentially including provisioning, deprovisioning, assignment of jobs, and/or configuration of resources.

A compute environment specification may also include additional metadata or configuration data usable for managing a set of computing resources. The additional metadata or configuration data may represent other properties or attributes of the compute environment or its constituent resources. For example, the compute environment specification may associate particular labels (including alphanumeric labels) with particular resources for ease of resource management. As another example, the compute environment specification may include data associating a compute environment with a virtual private cloud (VPC) representing a virtual network, e.g., within the provider network 190. The VPC may be isolated from other resources and VPCs within the provider network 190 and may have its own range of IP addresses referred to as a subnet; resources in the compute environment may be launched into the subnet.

The compute environment management system 100 may include a computing resource selector component 140. Using the computing resource selector 140, the compute environment management system 100 may select and reserve (by interacting with the resource manager 180) one or more of the computing resources 190A-190N of a provider network 190 for a particular compute environment associated with a particular client. For a particular compute environment, the computing resource selector 140 may select computing resources having particular configurations, such as compute instances of particular instance types and/or software configurations with particular parameter values. In one embodiment, the particular configurations may be selected based (at least in part) on input from a client, such as a list of instance types that are usable within a compute environment or a list of instance types on which a task is to be tested for optimization purposes. In one embodiment, the particular configurations may be selected without input from a client, e.g., automatically and/or programmatically by one or more components of the compute environment management system 100. Particular configurations may be selected based on job definitions. For example, if a job definition indicates that a particular number of virtual CPUs is required for a task, or a particular amount of memory is required, then only computing resources that meet or exceed such requirements may be selected in one embodiment.

The compute environment management system 100 may also include a job scheduler component 150. Using the job scheduler 150, the compute environment management system 100 may receive job definitions 111A-111N from clients 110A-110N and cause those jobs to be executed using the computing resources in compute environments associated with the clients. The job scheduler 150 may implement one or more queues associated with queue identifier(s) provided by a client and mapped to a particular compute environment. The job scheduler 150 may determine a time at which to initiate execution of a particular job within a compute environment associated with the client that provided the job. In one embodiment, the job scheduler 150 and/or computing resource selector 140 may determine one or more particular computing resources with which to initiate execution of a particular job within a compute environment associated with the client that provided the job.

The client devices 110A-110N may represent or correspond to various clients, users, or customers of the compute environment management system 100 and of the provider network 190. The clients, users, or customers may represent individual persons, businesses, other organizations, and/or other entities. The client devices 110A-110N may be distributed over any suitable locations or regions. A user of a client device may access the compute environment management system 100 with a user account that is associated with an account name or other user identifier. The user may belong to an organization (e.g., a business entity) that is a client or customer of the compute environment management system 100, e.g., with an arrangement in place to pay fees for use of the compute environment management system and/or provider network 190. The user account may be controlled by an individual user or by multiple users within an organization. Each of the client devices 110A-110N may be implemented using one or more computing devices, any of which may be implemented by the example computing device 3000 illustrated in FIG. 9. The clients 110A-110N may be coupled to the compute environment management system 100 via one or more networks, potentially including the Internet. Although three clients 110A, 110B, and 110N are shown for purposes of illustration and example, it is contemplated that any suitable number and configuration of client devices may be used to provide configuration information and jobs 111A-111N to the compute environment management system 100 and provider network 190.

The client devices 110A-110N may encompass any type of client configurable to submit configuration information to the compute environment management system 100. For example, a given client device may include a suitable version of a web browser, or it may include a plug-in module or other type of code module configured to execute as an extension to or within an execution environment provided by a web browser. Alternatively, a client device may encompass an application such as a database application (or user interface thereof), a media application, an office application, or any other application that may interact with the client interface 120 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client devices 110A-110N may be configured to generate network-based service requests according to a Representational State Transfer (REST)-style network-based services architecture, a document- or message-based network-based services architecture, or another suitable network-based services architecture. In some embodiments, one of the client devices 110A-110N may be configured with access to a virtual compute instance in the provider network 190 in a manner that is transparent to applications implement on the client device utilizing computational resources provided by the virtual compute instance. In at least some embodiments, client devices 110A-110N may provision, mount, and configure storage volumes implemented at storage services within the provider network 190 for file systems implemented at the client devices.

Client devices 110A-110N may convey network-based service requests to the compute environment management system network 100 via one or more networks. In various embodiments, the network(s) may encompass any suitable combination of networking hardware and protocols necessary to establish network-based communications between client devices 110A-110N and compute environment management system 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given client device and the compute environment management system 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the compute environment management system 100. It is noted that in some embodiments, client devices 110A-110N may communicate with compute environment management system 100 using a private network rather than the public Internet.

The provider network 190 may include a plurality of computing resources such as resources 190A through 190N through 190Z. The resources may include compute instances, storage instances, and so on. The resources offered by the provider network 190 may vary in their respective configurations. As used herein, the configuration of a computing resource may include its instance type, hardware capabilities (e.g., type and number of processor cores, type and number of virtual CPUs, type and amount of memory and storage, presence or absence of specialized coprocessors such as a graphics processing unit (GPU), presence or absence of particular application-specific integrated circuits (ASICs) or field-programmable gate arrays (FPGAs), and so on), software configuration (e.g., operating system type and configuration, virtualized execution environment type and configuration, application type and configuration, and so on), and/or other suitable characteristics. For example, the provider network may include a set of compute instances (physical compute instances and/or virtual compute instances) of different compute instance types, where the compute instance types may vary in the capabilities and features of their processor resources, memory resources, storage resources, network resources, and so on, and potentially in their cost as well. The configuration of a computing resource may impact the performance of that resource for executing a particular task, such that resources having different configurations may vary in performance (e.g., processor performance, execution time, memory usage, storage usage, network usage, energy usage, and so on) for the same or similar tasks. The resources offered by the provider network 190 may also vary in their respective costs that are assessed to clients for reserving and/or using the resources. Additionally, the resources offered by the provider network 190 may vary in their availability at particular times. As shown in the example of FIG. 1, the provider network 190 may include a set of one or more computing resources 190A having configuration "A," a set of one or more computing resources 190N having configuration "N," a set of one or more computing resources 190Z having configuration "Z," and potentially many other resources having different configurations.

When not in use by clients, the computing resources 190A-190Z may belong to a pool of available computing resources. The resource manager 180 may reserve and provision individual ones of the resources 190A-190Z for individual clients. The resource manager 180 may also deprovision individual ones of the resources 190A-190Z and return them to the pool of available resources of the provider network 190. Although three computing resources 190A, 190N, and 190Z are shown for purposes of illustration and example, it is contemplated that any suitable number and configuration of computing resources may be used to execute jobs in a compute environment managed by the compute environment management system 100. It is contemplated that the provider network 190 may include additional components not shown, fewer components than shown, or different combinations, configurations, or quantities of the components shown.

A network set up by an entity such as a company or a public sector organization to provide one or more services (such as various types of network-accessible computing or storage) accessible via the Internet and/or other networks to a distributed set of clients may be termed a provider network. A provider network such as network 190 may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network 190 in different embodiments, including general purpose or special purpose computer servers, storage devices, network devices, and the like. Because resources of the provider network 190 may be under the control of multiple clients (or tenants) simultaneously, the provider network may be said to offer multi-tenancy and may be termed a multi-tenant provider network. For example, virtual compute instances in the multi-tenant provider network 190 may be concurrently used for the processing of jobs by client 110A as well as by client 110B.

In some embodiments, an operator of the provider network 190 may implement a flexible set of resource reservation, control, and access interfaces for their clients. For example, the resource manager 180 may implement a programmatic resource reservation interface (e.g., via a web site or a set of web pages) that allows clients and/or other components such as the system 100 to learn about, select, purchase access to, and/or reserve compute instances offered by the provider network 190. Such an interface may include capabilities to allow browsing of a resource catalog and provide details and specifications of the different types or sizes of resources supported, the different reservation types or modes supported, pricing models, and so on. The provider network 190 may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one-year or three-year term, and pay a low hourly rate for the instance; the client may be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: i.e., a resource instance that was previously allocated to the client may be reclaimed by the resource manager 180 and may be allocated to some other client that is willing to pay a higher price. Other purchasing modes or combinations of modes may be implemented by the resource manager 180 in some embodiments.

In one embodiment, the provider network 190 may offer virtual compute instances with varying computational and/or memory resources. In one embodiment, each of the virtual compute instances may correspond to one of several instance types. An instance type may be characterized by its computational resources (e.g., number, type, and configuration of central processing units [CPUs] or CPU cores, including virtual CPUs), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the resource manager 180, an instance type may be selected for a job, e.g., based (at least in part) on input from the client. For example, a client may choose an instance type from a predefined set of instance types. As another example, a client may specify the desired resources of an instance type for a job (e.g., in the job definition), and the resource manager 180 may select an instance type based on such a specification.

Virtual compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Configurations of virtual compute instances may also include their location in a particular data center or availability zone, geographic location, and (in the case of reserved compute instances) reservation term length.

The compute environment management system 100 may automatically manage the provisioning and deprovisioning of scheduled reserved compute instances on behalf of clients, e.g., such that scheduled reserved instances are automatically added to or removed from particular compute environments at appropriate times. Scheduled reserved instances may include computing resources (e.g., compute instances) that are accessible by or on behalf of a client for a particular period of time, e.g., based on a reservation. In one embodiment, the computing resources associated with such a reservation may be exclusively used by a particular client and not by other clients during the period of time. The compute environment management system 100 may automatically manage job queues associated with scheduled reserved compute instances and their compute environments, e.g., such that clients may add jobs to the queues before and/or during the windows of time associated with the scheduled reserved instances.

Figure 9:
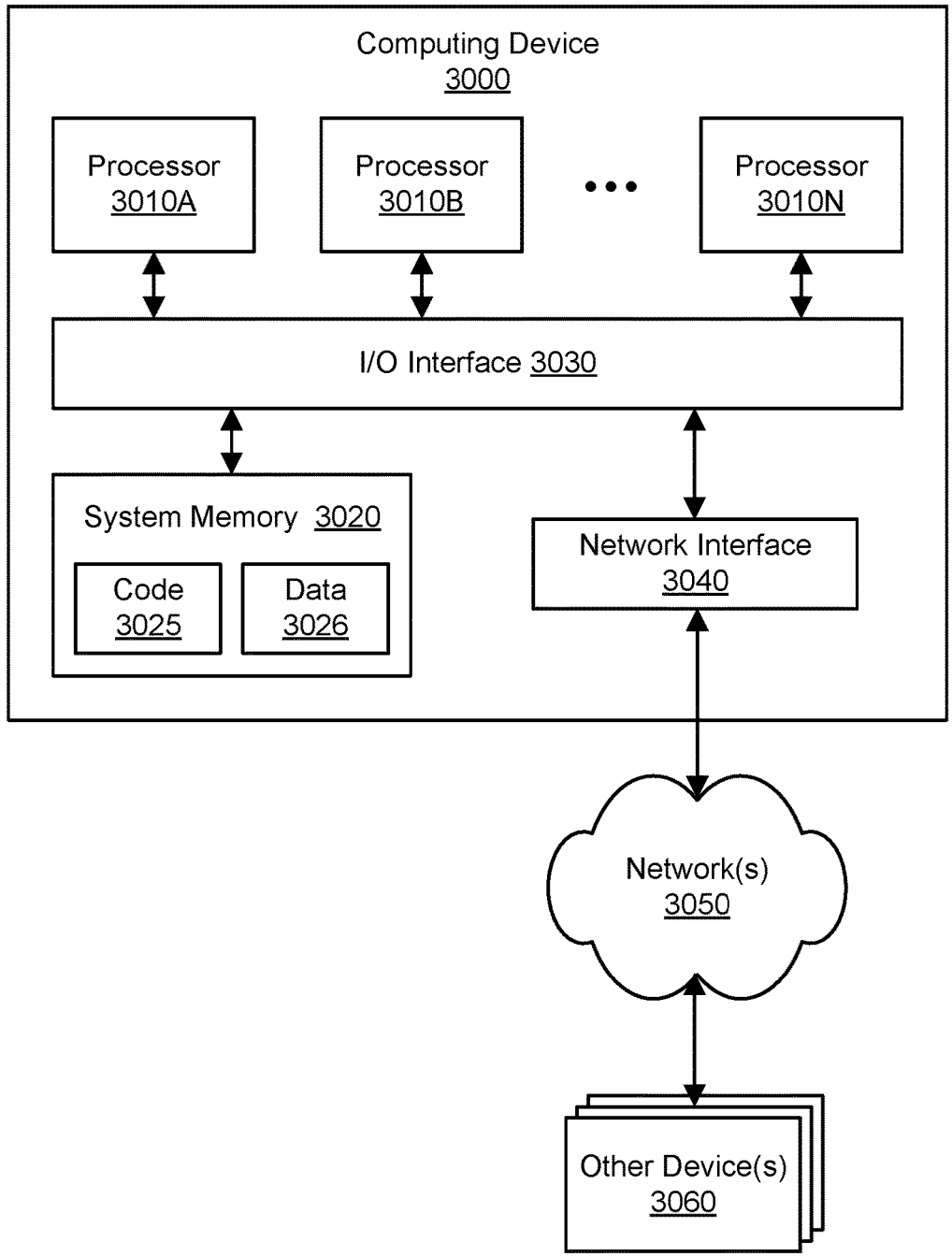
FIG. 9 illustrates an example computing device that may be used in some embodiments.

The compute environment management system 100 may include a plurality of computing devices, any of which may be implemented by the example computing device 3000 illustrated in FIG. 9. In various embodiments, portions of the described functionality of the compute environment management system 100 may be provided by the same computing device or by any suitable number of different computing devices. If any of the components of the compute environment management system 100 are implemented using different computing devices, then the components and their respective computing devices may be communicatively coupled, e.g., via a network. Each of the illustrated components may represent any combination of software and hardware usable to perform their respective functions. It is contemplated that the compute environment management system 100 may include additional components not shown, fewer components than shown, or different combinations, configurations, or quantities of the components shown.

Figure 2A:
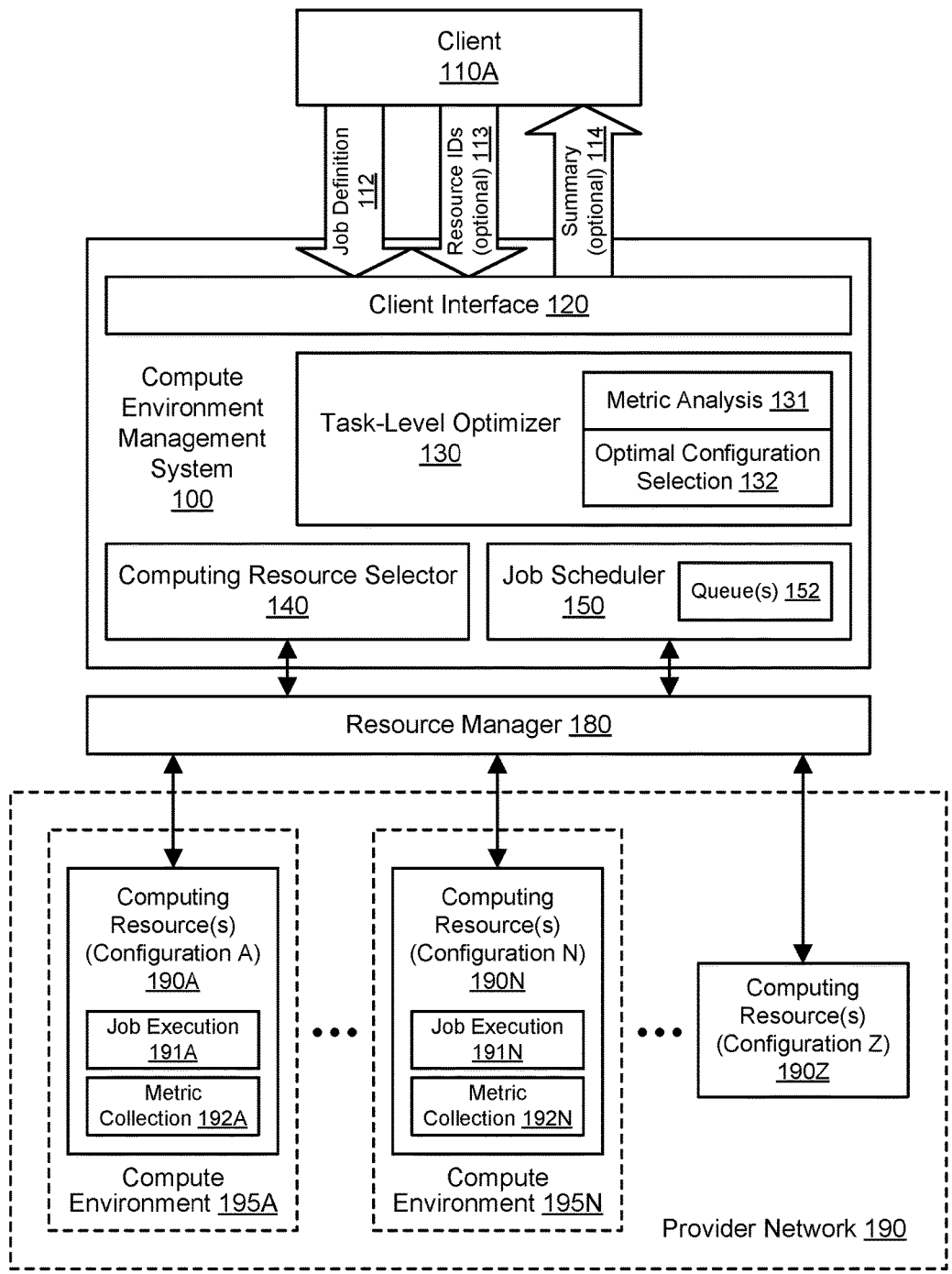
FIG. 2A illustrates further aspects of the example system environment for task-level optimization with compute environments, including deployment of one or more tasks to computing resources having different configurations, according to one embodiment.

FIG. 2A illustrates further aspects of the example system environment for task-level optimization with compute environments, including deployment of one or more tasks to computing resources having different configurations, according to one embodiment. The client 110A may provide a job definition 112 to the compute environment management system 100. As discussed above, the job definition 112 may specify or reference one or more tasks to be performed by computing resources in the provider network. The tasks within a job definition may include entirely different tasks (e.g., tasks having different program code) and/or tasks that run the same program code for different input data. For a particular task, the job definition 112 may include or reference program instructions to be executed in processing the task. The job definition may also indicate anticipated resource usage or resource requirements, such as one or more values (including a range of values) for anticipated processor usage, memory usage, storage usage, network usage, and/or other hardware resource characteristics. In some embodiments, the job definition may indicate, for one or more tasks, the anticipated or required hardware capabilities (e.g., type and number of processor cores, type and number of virtual CPUs, type and amount of memory and storage, presence or absence of specialized coprocessors such as a graphics processing unit (GPU), presence or absence of particular application-specific integrated circuits (ASICs) or field-programmable gate arrays (FPGAs), and so on), software configuration (e.g., operating system type and configuration, virtualized execution environment type and configuration, application type and configuration, and so on), and/or other suitable characteristics.

The job definition 112 may be intended to be executed without delay or at a future point in time, e.g., based on a client-specified schedule. In one embodiment, the task-level optimization may be performed without delay upon receiving the job definition 112 and/or prior to executing the corresponding task(s) for the first time. In one embodiment, the job definition 112 may represent an existing job definition whose task(s) have previously been executed in the provider network 190, and the task-level optimization may be performed to optimize the old, existing job definition. In one embodiment, the task-level optimization may be performed with prior approval by the client 110A who submitted the job definition 112. In one embodiment, the task-level optimization may be performed automatically and without a need for prior approval by the client 110A who submitted the job definition 112.

Computing resources that vary in configuration may be selected from the provider network 190 for execution of the task(s), e.g., by one or more components such as the computing resource selector 140. As shown in the example of FIG. 2A, one or more computing resources 190A of the configuration "A" may be selected for task-level optimization. Additionally, one or more computing resources 190N of the configuration "N" may be selected for task-level optimization. Other types of resources may be used as well, as indicated by the ellipsis. Other types of configurations, such as resources 190Z of configuration Z, may not be used for task-level optimization for these particular task(s). The selected computing resources 190A-190N may be provisioned from the provider network 190 (e.g., using a component such as a resource manager 180) and placed in one or more compute environments associated with the client. In one embodiment, each type of configuration may be isolated in its own compute environment, such as compute environment 195A for the resources 190A and compute environment 195N for resources 190N. However, it is also contemplated that a compute environment may include more than one type of resource configuration, e.g., compute instances of more than one instance type. For optimization of one or more particular task(s), computing resources having particular configurations may be selected, such as compute instances of particular instance types and/or software configurations with particular parameter values. In one embodiment, the particular configurations A through N may be selected based (at least in part) on input from the client, such as a list 113 of resource type identifiers that are usable within a compute environment or a list of resource types on which a task is to be tested for optimization purposes. In one embodiment, the particular configurations A through N may be selected without input 113 from a client, e.g., automatically and/or programmatically by one or more components of the compute environment management system 100. Particular configurations may be selected based on job definitions. For example, if a job definition indicates that a particular number of virtual CPUs is required for a task, or a particular amount of memory is required, then only computing resources that meet or exceed such requirements may be selected in one embodiment.

Execution of the task(s) may be initiated using the computing resources 190A-190N. The resources may be configured for job execution, e.g., the resources 190A may include one or more components 191A for job execution while the resources 190N may include one or more components 191N for job execution. Initiating the execution of a task may include the compute environment management system 100 interacting with a resource manager 180 to provision, configure, and launch one or more compute instances to run the task. Provisioning a resource may include reserving, configuring, and/or launching the resource. In a multi-tenant provider network 190, a compute instance may represent a virtual compute instance running on a physical compute instance, and the physical compute instance may be selected from a set of different instance types having different configurations or capabilities and potentially a different fee structure for usage. Each instance may be used for one or more tasks in the workload and then deprovisioned or reconfigured for use by the same client. In one embodiment, a container management system may be used with the virtual compute instances to deploy the program instructions supplied or otherwise referenced by the client. For example, the provisioned instance may be launched using a machine image that includes a container management system. In various embodiments, the instance may be launched before the task is scheduled or in response to the scheduling of the job. After launch, a container may be filled with the program instructions indicated by the client for performing the task. In one embodiment, tasks may also represent programs (and potentially input data) submitted to a program execution service that manages its own fleet of compute instances. The execution of the task(s) may represent consecutive and/or concurrent execution of multiple tasks or copies of tasks, often using multiple compute instances or other computing resources operating in parallel. In one embodiment, output associated with the task(s) may be returned to the client. In one embodiment, the job execution 191A-191N may be configured for tasks associated with batch applications. In one embodiment, the job execution 191A-191N may be configured for web applications, microservice applications, and/or services running on top of an environment such as a container service.

The execution of the task(s) may be monitored, and one or more metrics associated with the execution may be generated and used as input to a component for metric analysis 131. The resources may be configured for metric collection, e.g., the resources 190A may include one or more components 192A for metric collection while the resources 190N may include one or more components 192N for metric collection. The metrics may relate to the performance of the execution. For example, the metrics may include one or more metrics related to processor usage, one or more metrics related to execution time, one or more metrics related to memory usage, one or more metrics related to storage usage, one or more metrics related to network usage, one or more metrics related to energy usage, and so on. As another example, the metrics may include one or more metrics related to the cost of the execution, including aggregate costs across all computing resources, per-resource costs, costs per hour, total costs for the duration of the task(s), and so on. The metrics may be generated on any suitable basis, such as the execution monitoring (using any suitable techniques, such as agent software or other instrumentation of compute instances, the use of an external metric collection service, and so on) and/or any tables or references indicating resource costs. In one embodiment, the metrics may be supplied to the client at one or more appropriate points in time, e.g., in the form of a summary 114. The metrics may be collected and analyzed using the metric analysis component 131.

Using a component for optimal configuration selection 132, a recommended or optimal configuration of computing resources may be determined for the task(s). The recommended configuration may be determined based (at least in part) on analysis of the metric(s) associated with the task execution. The recommended configuration may indicate one or more instance types for compute instances, a number or range of numbers of compute instances (per instance type or for all instance types), a hardware configuration for a compute instance (potentially including a number of cores, number of virtual CPUs, chipset, processor speed, bus speed, memory configuration, and so on), one or more instance types for other types of resources, one or more number or ranges of numbers of other types of resources, one or more parameter values for operating system software, one or more parameter values for application software (e.g., an application used to perform the task(s)), one or more parameter values for execution environment software (e.g., a virtualized execution environment such as a virtual machine), any other suitable configuration values, and/or a combination thereof. The recommended configuration may include one of the configurations A through N associated with the computing resources 190A-190N. Alternatively, the recommended configuration may include a configuration that has not been previously tested but is determined through other techniques, e.g., using machine learning based (at least in part) on the metrics collected for resources 190A-190N. In one embodiment, the recommended configuration may be provided to the client 110A in the form of a summary 114 of the testing results. In one embodiment, the job definition 112 may be automatically and programmatically modified to reflect the recommended configuration, such as by updating the processor or memory requirements in the job definition.

In one embodiment, the recommended configuration may be determined to optimize for one or more goals, such as one or more cost goals and/or one or more performance goals. The optimization goals may be determined based on input from the client 110A, based on system defaults, or on any other suitable basis. For example, a client may seek to optimize a task primarily for execution time but secondarily for cost. Based (at least in part) on the metric analysis 131, the various resource configurations 190A-190N may be ranked by execution time. For configurations with the shortest execution time, one or more of the least expensive configurations may be recommended for that task. Any suitable combination and priority of optimization goals may be used to determine one or more recommended configurations. The recommended configuration may also be referred to as an optimal or optimized configuration. As used herein, terms such as "optimization," "optimize," "optimized," and "optimal" generally refer to a process of improvement in one or more characteristics and not necessarily to reaching a perfect or ideal state. As will be discussed below with respect to FIG. 3 and FIG. 4, a compute environment may be provisioned with one or more computing resources consistent with the recommended configuration and used for further execution of the task(s).

Figure 2B:
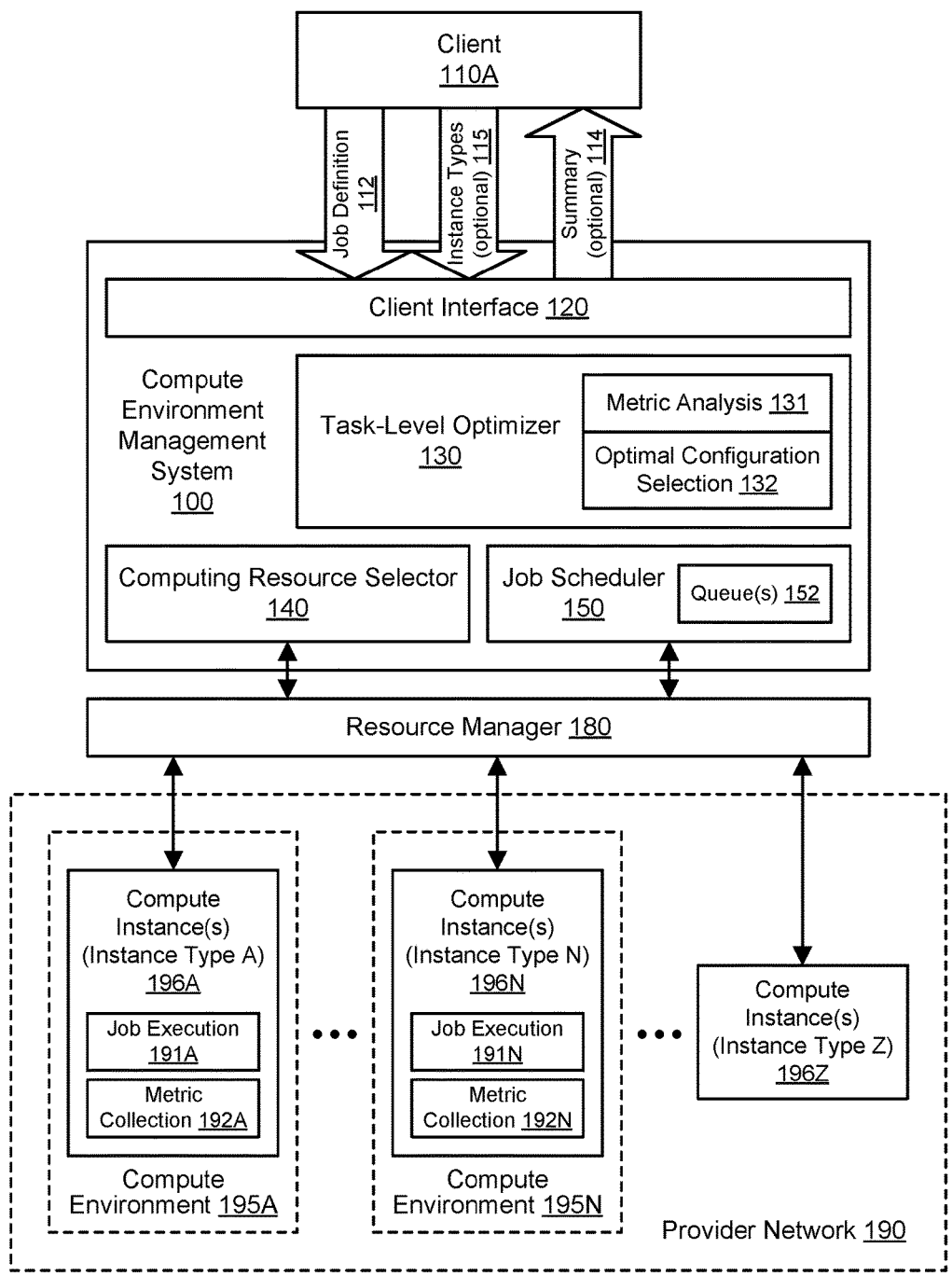
FIG. 2B illustrates further aspects of the example system environment for task-level optimization with compute environments, including deployment of one or more tasks to compute instances of different instance types, according to one embodiment.

FIG. 2B illustrates further aspects of the example system environment for task-level optimization with compute environments, including deployment of one or more tasks to compute instances of different instance types, according to one embodiment. The computing resources that are tested for task-level optimization may include compute instances of varying instance types. Compute instance types may vary in computational characteristics, memory characteristics, and/or other hardware characteristics, potentially including the capabilities and features of their processor resources, memory resources, storage resources, network resources, and so on. Further examples of characteristics in which compute instance types may vary may include the type and number of processor cores or virtual CPUs, the type and amount of memory and storage, the presence or absence of specialized coprocessors such as a graphics processing unit (GPU), and so on. As shown in the example of FIG. 2B, the selected instances may include one or more compute instances 196A of instance type "A" and one or more compute instances 196N of instance type "N." In one embodiment, not all instance types offered by the provider network 190, such as instances 196Z of type "Z," may be tested for particular tasks. In one embodiment, the particular configurations A through N may be selected based (at least in part) on input from the client, such as a list 115 of instance types on which a task is to be tested for optimization purposes. In one embodiment, the particular configurations A through N may be selected without input 115 from a client, e.g., automatically and/or programmatically by one or more components of the compute environment management system 100. In one embodiment, each instance type may be isolated in its own compute environment, such as compute environment 195A for the instances 196A and compute environment 195N for instances 196N. However, it is also contemplated that a compute environment may include more than one instance type.

Figure 2C:
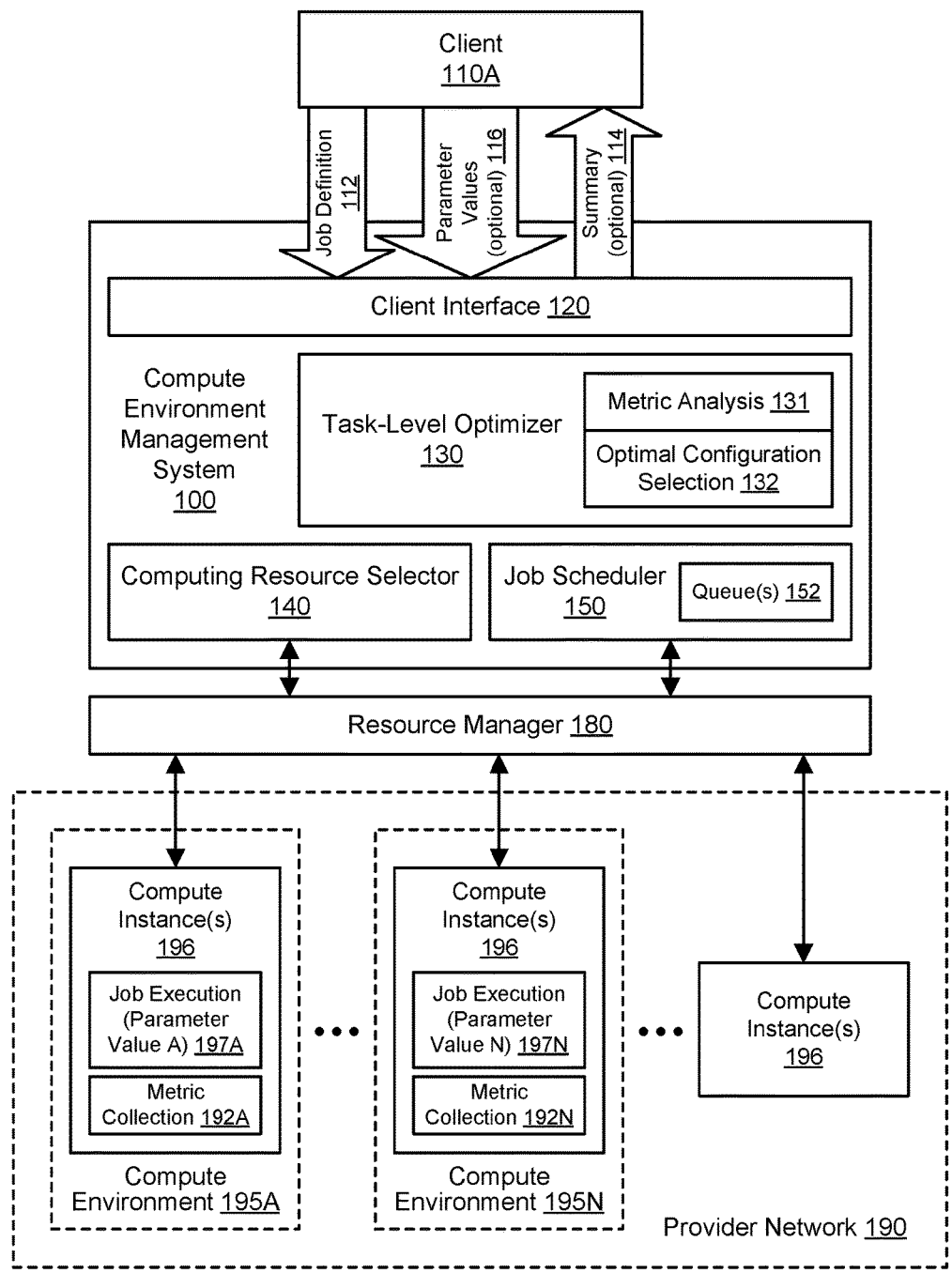
FIG. 2C illustrates further aspects of the example system environment for task-level optimization with compute environments, including deployment of one or more tasks to compute instances running software with different configuration parameter values, according to one embodiment.

FIG. 2C illustrates further aspects of the example system environment for task-level optimization with compute environments, including deployment of one or more tasks to compute instances running software with different configuration parameter values, according to one embodiment. The computing resources that are tested for task-level optimization may include compute instances 196 of one or more instance types. While the instance types or other hardware configuration may not vary for the testing of one or more tasks, one or more application configuration parameter values may be varied throughout the fleet of instances. The instances 196 may be configured for job execution for various parameter values, such as job execution 197A for parameter value "A" for a particular parameter and job execution 197N for parameter value "N" for the particular parameter. For example, an application that runs in a virtual machine platform may be executed in different virtual machines having different memory configurations in order to determine an optimal configuration. In one embodiment, the particular parameter values A through N may be selected based (at least in part) on input from the client, such as a list 116 of parameter values for which a task is to be tested for optimization purposes. In one embodiment, the particular parameter values A through N may be selected without input 116 from a client, e.g., automatically and/or programmatically by one or more components of the compute environment management system 100. In one embodiment, each parameter value may be isolated in its own compute environment, such as compute environment 195A for the parameter value A and compute environment 195N for the parameter value N. However, it is also contemplated that a single compute environment may include software with a range of values for the parameters of interest. For example, the job execution 197A-197N may be implemented as an array job within one compute environment. In this manner, a parametric sweep may be performed for a particular software parameter to determine a recommended or optimal value.

Figure 3:
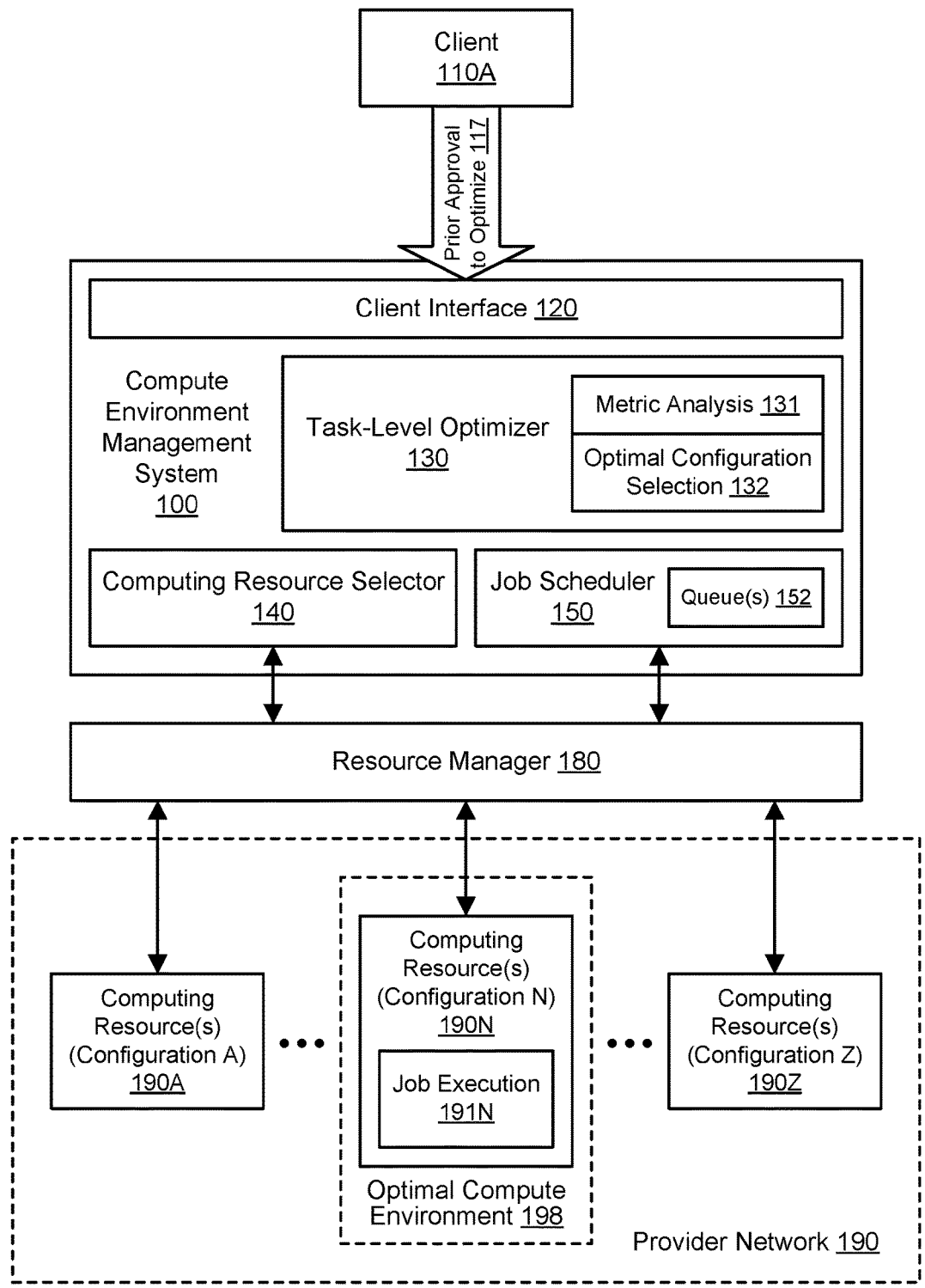
FIG. 3 illustrates further aspects of the example system environment for task-level optimization with compute environments, including automatic selection of an optimal configuration and deployment to an optimal compute environment, according to one embodiment.

FIG. 3 illustrates further aspects of the example system environment for task-level optimization with compute environments, including automatic selection of an optimal configuration and deployment to an optimal compute environment, according to one embodiment. In one embodiment, client approval may be sought to implement a recommended configuration. As shown in the example of FIG. 3, the client approval may be sought prior to the configuration testing and prior to the determination of the recommended configuration. If such prior approval 117 is received from the client 110A, then the compute environment management system 100 may automatically provision a compute environment 198 with one or more computing resources (such as resources 190N) consistent with the recommended configuration. In one embodiment, a job definition 112 associated with the task(s) may also be automatically and programmatically modified to reflect aspects of the recommended configuration. The recommended or "optimal" compute environment 198 may be used for further execution of the task(s), e.g., to execute additional copies of the task(s) associated with the modified job definition, potentially with new input data. In one embodiment, the provisioning of the compute environment 198 may be performed only after the client 110A has indicated that the task(s) should be performed again, e.g., by supplying new input data for the task(s) associated with the modified job definition. In one embodiment, the provisioning of the compute environment 198 may be performed only after a scheduled time is reached for the task(s). In this manner, additional execution of the task(s) may be performed in a compute environment 198 that has been optimized based (at least in part) on testing of the task(s) with multiple resource configurations.

Figure 4:
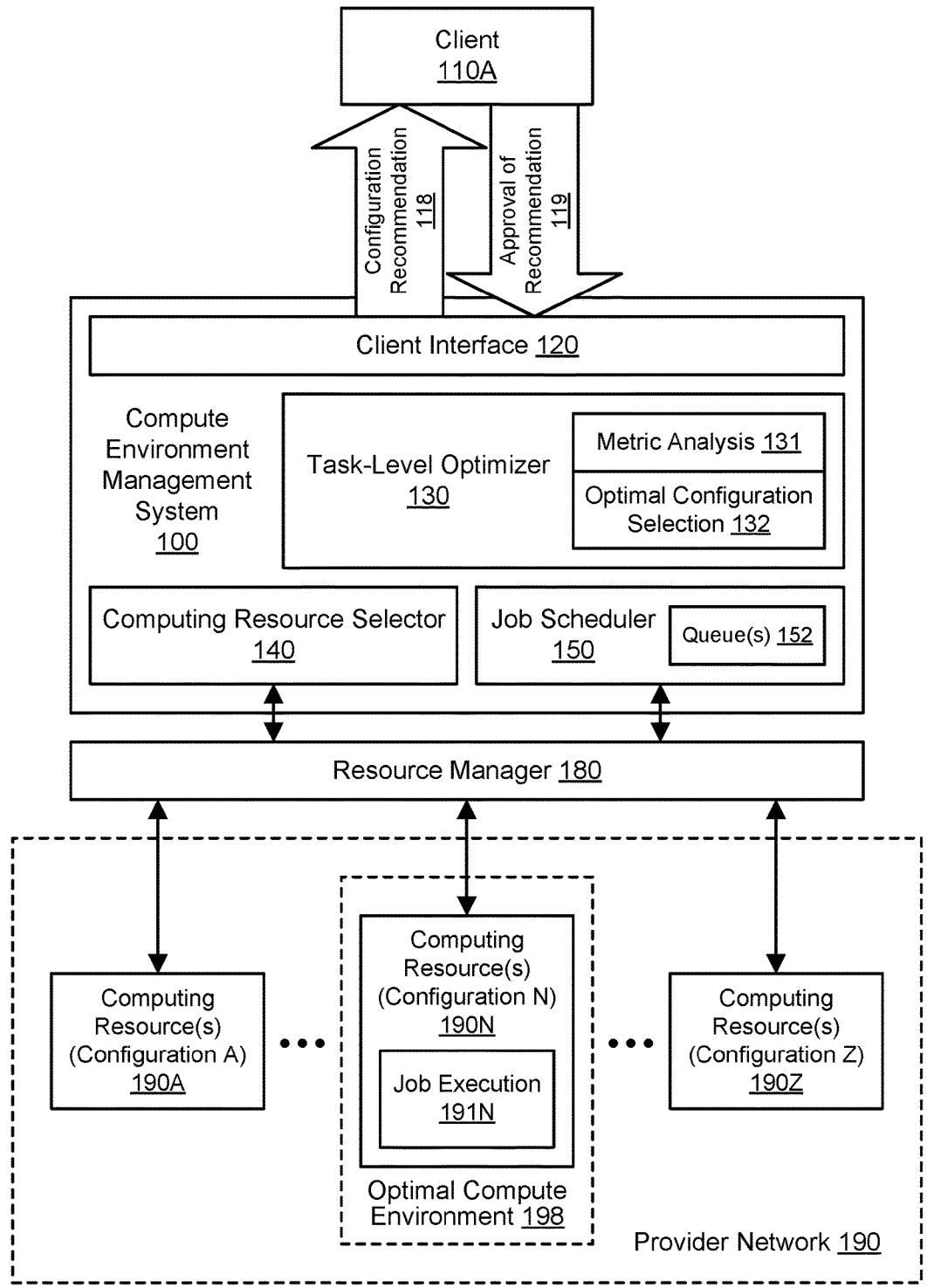
FIG. 4 illustrates further aspects of the example system environment for task-level optimization with compute environments, including client-approved selection of an optimal configuration and deployment to an optimal compute environment, according to one embodiment.

FIG. 4 illustrates further aspects of the example system environment for task-level optimization with compute environments, including client-approved selection of an optimal configuration and deployment to an optimal compute environment, according to one embodiment. In one embodiment, client approval may be sought to implement a recommended configuration. As shown in the example of FIG. 4, the client approval may be sought after the configuration testing and after the determination of the recommended configuration. The configuration recommendation 118 may be presented to the client 110A, and input representing approval or disapproval of the recommendation may be solicited. In one embodiment, multiple configurations or a range of configuration values may be presented in the recommendation 118, and input from the client may be solicited to select one or more of those configurations or values. In one embodiment, the recommendation 118 may indicate recommended changes to hardware requirements in the job definition, such as an increase or decrease in a number of virtual CPUs or other hardware characteristics. The input may also be solicited through any appropriate interface(s), e.g., in a management console.

If approval 119 of the recommendation is received from the client 110A, then the compute environment management system 100 may automatically modify the job definition 112 to reflect any changed requirements or recommendations for a hardware configuration and/or software configuration associated with the task(s). If approval 119 of the recommendation is received from the client 110A, then the compute environment management system 100 may, at some point, automatically provision a compute environment 198 with one or more computing resources (such as resources 190N) consistent with the recommended configuration for further execution of tasks associated with the modified job definition. The recommended or "optimal" compute environment 198 may be used for further execution of the task(s), e.g., to execute additional copies of the task(s) in the job definition, potentially with new input data. In one embodiment, the provisioning of the compute environment 198 may be performed only after the client 110A has indicated that the task(s) should be performed again, e.g., by supplying new input data for the task(s). In one embodiment, the provisioning of the compute environment 198 may be performed only after a scheduled time is reached for the task(s). In this manner, additional execution of the task(s) may be performed in a compute environment 198 that has been optimized based (at least in part) on testing of the task(s) with multiple resource configurations.

If the client 110A does not provide approval 119, then no further action may be taken with regard to the recommendation. Alternatively, the testing process may be repeated, but the range of configurations may be altered, e.g., to remove the recommended configuration N and seek a different configuration. In one embodiment, the client 110A may instead manually craft an optimal configuration or modified job definition using the summary 114 of the testing and/or configuration recommendation 118.

Figure 5:
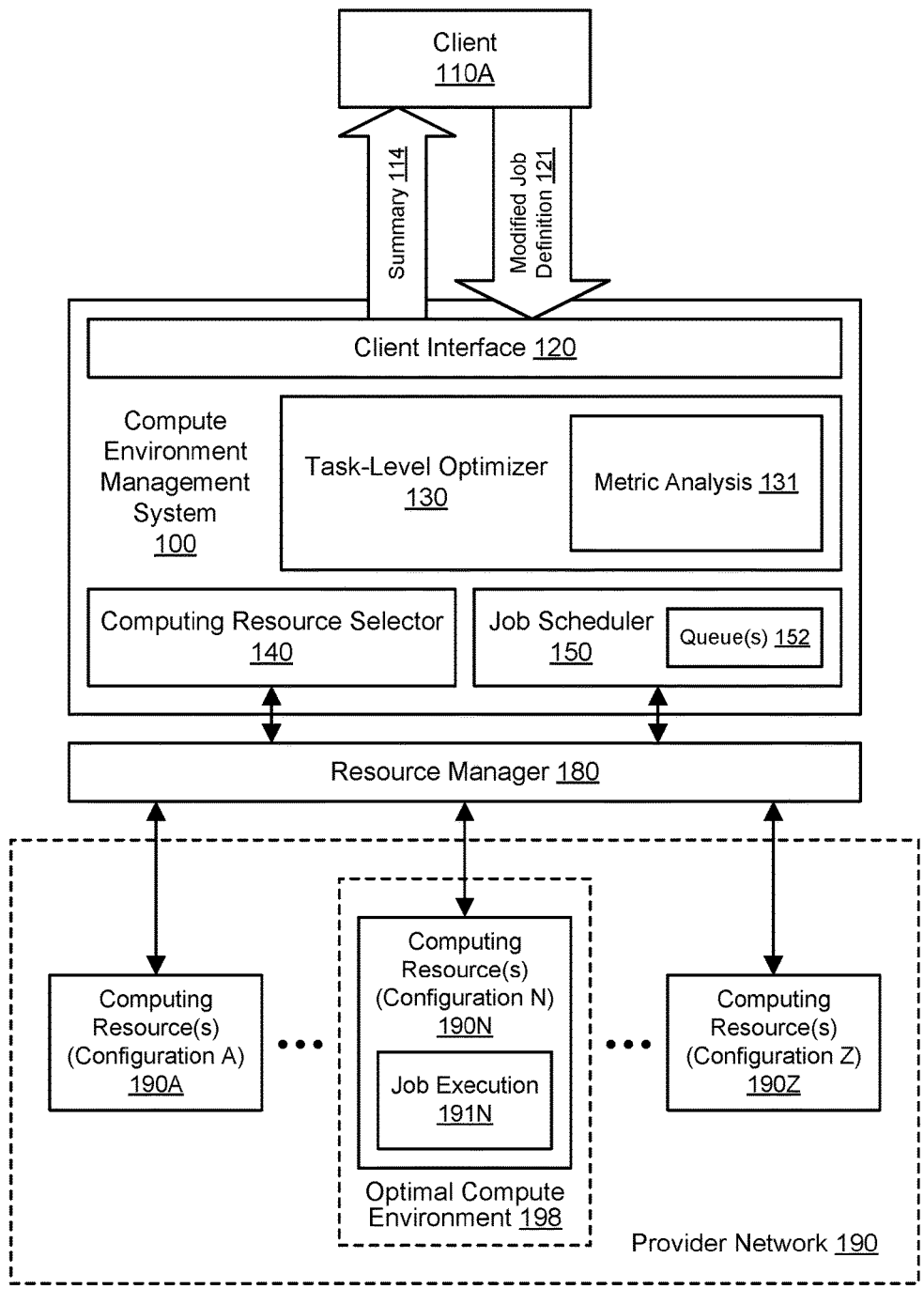
FIG. 5 illustrates further aspects of the example system environment for task-level optimization with compute environments, including deployment of resources to an optimal compute environment based (at least in part) on a modified job definition provided by a client, according to one embodiment.

FIG. 5 illustrates further aspects of the example system environment for task-level optimization with compute environments, including deployment of resources to an optimal compute environment based (at least in part) on a modified job definition provided by a client, according to one embodiment. As discussed above, using the metric analysis component 131, the compute environment management system 100 may generate a summary 114 of the metrics associated with execution of the job definition 112 using various resource configurations. The system 100 may then present the summary 114 to the client 110A, e.g., using a management console of the client interface 120. The client 110A may then generate and submit a modified job definition 121, where the modifications may be made based (at least in part) on the summary 114 of the performance testing using the various configurations. The modified job definition 121 may update any recommendations or requirements for a hardware configuration and/or software configuration associated with one or more tasks. Based (at least in part) on the modified job definition 121, the compute environment management system 100 may, at some point, automatically provision a compute environment 198 with one or more computing resources (such as resources 190N) consistent with the resource configuration indicated in the modified job definition.

Figure 6:
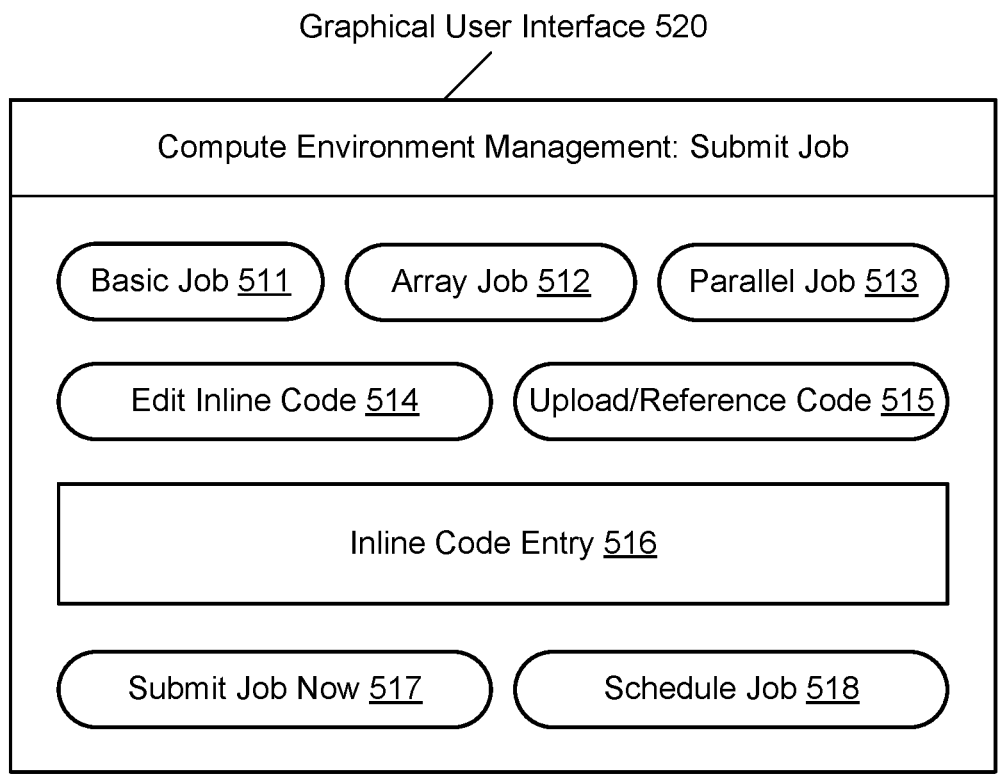
FIG. 6 illustrates an examples of a graphical user interface for submitting a job to a compute environment, according to one embodiment.

FIG. 6 illustrates an examples of a graphical user interface for submitting a job to a compute environment, according to one embodiment. The compute environment management system 100 may permit a user to submit jobs to be executed in a compute environment. To submit a job to a compute environment, the user may interact with one or more interfaces of the compute environment management system 100, such as an application programming interface (API), command-line interface (CLI), and/or graphical user interface (GUI). Using the client interface 120, the compute environment management system 100 may present a graphical user interface (GUI) 520 for submitting jobs to a managed compute environment. The GUI 520 may include any suitable interface elements for choosing job types, specifying or referencing job code, and/or scheduling jobs.

The compute environment management system 100 may support different types of jobs such as basic jobs, array jobs, and parallel jobs. A basic job may represent a command or shell script that will be executed once or retried until it is considered to have failed. An array job may represent a job that shares common parameters, such as virtual compute instances and memory, and that runs as a collection of related but separate basic jobs, potentially in parallel across multiple hosts. Examples of typical array jobs may include Monte Carlo simulations, parametric sweeps, and large rendering jobs. A parallel job may represent a parallel, tightly coupled workload, potentially using many compute instances running concurrently. Jobs may also be submitted as parts of workflows, such that some jobs may be scheduled only if their dependencies are met. In one embodiment, the GUI 520 may include an interface element 511 (e.g., a button) for choosing a basic job, an interface element 512 (e.g., a button) for choosing an array job, and/or an interface element 513 (e.g., a button) for choosing a parallel job.

The GUI 520 may include an interface element 514 (e.g., a button) for choosing to edit or enter inline program code for a job, along with an interface element 516 (e.g., a text entry box) for entry of inline program code, and/or an interface element 515 (e.g., a button) to upload or provide a reference to program code for a job. Additionally, the GUI 520 may include an interface element 517 (e.g., a button) to submit the job for execution without delay and/or an interface element 518 (e.g., a button) to schedule the job for execution at a later point in time. In one embodiment, the GUI 520 may also permit the selection of a particular queue (e.g., based on its queue identifier) for the job. Suitable user input to the GUI 520 may be used to submit jobs. For example, the user may operate a browser program on a client computing device that presents the GUI 520; the browser may then interact with the compute environment management system via an API to implement the submission of the job to the compute environment.

In one embodiment, a graphical user interface associated with the compute environment management system 100 may provide (e.g., to a user) analysis or results of the automated resource management. For example, a management console may present information about the cost of the compute environment over a particular period of time. The cost information may be presented in the aggregate and/or broken down by resource type, queue ID, and/or job type. As another example, a management console may present information about performance or usage analysis, such as job throughput, in the compute environment. The performance or usage information may be presented in the aggregate and/or broken down by resource type, queue ID, and/or job type. The management console may be implemented in the client interface 120.

Figure 7:
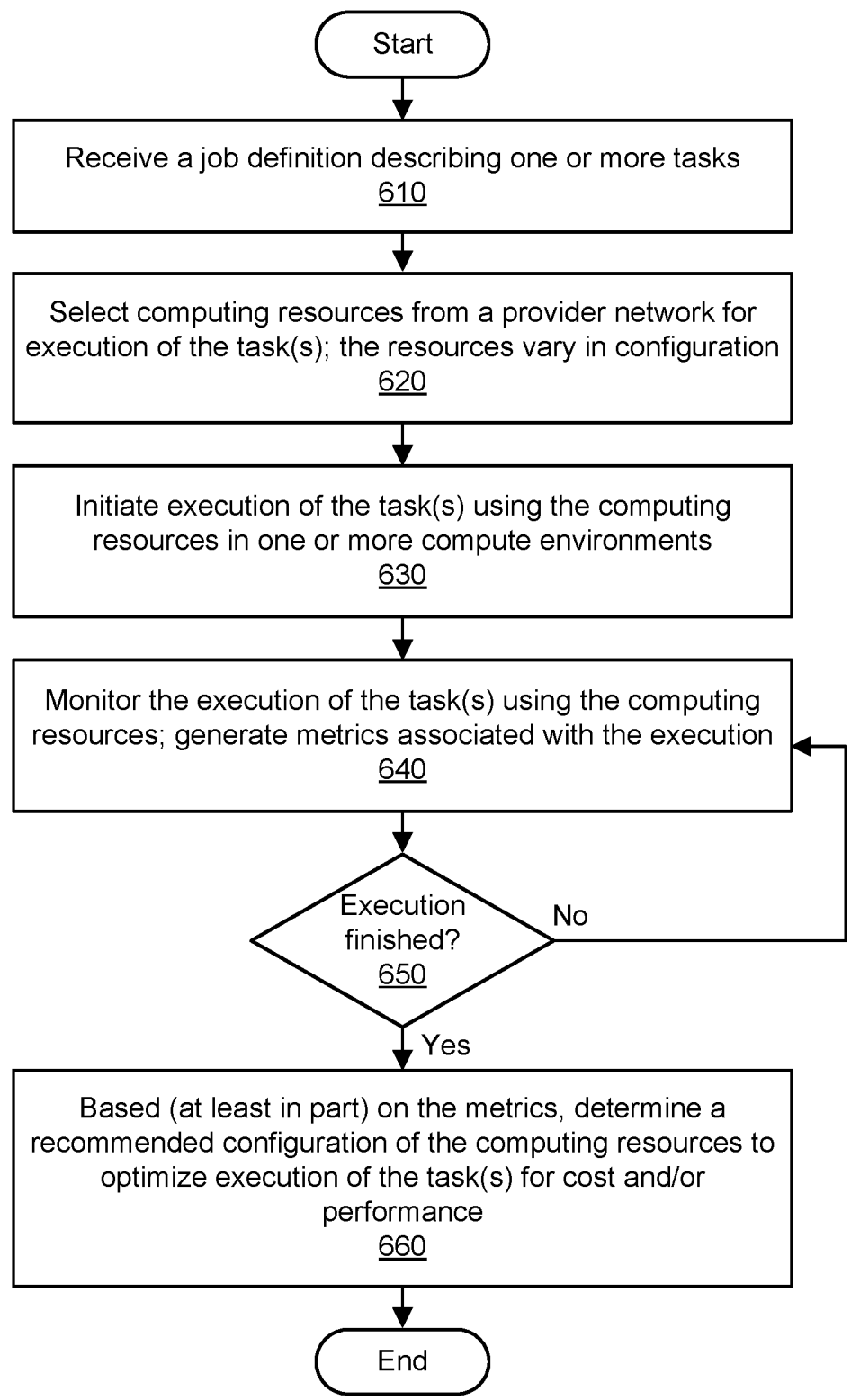
FIG. 7 is a flowchart illustrating a method for task-level optimization with compute environments, according to one embodiment.

FIG. 7 is a flowchart illustrating a method for task-level optimization with compute environments, according to one embodiment. Various ones of the operations shown in FIG.

7 may be performed (at least in part) or otherwise orchestrated by a compute environment management system. However, the compute environment management system may interact with other components, such as a client computing device and components of a multi-tenant provider network (potentially including a resource manager and a plurality of computing resources). The multi-tenant provider network may offer a pool of available computing resources. The computing resources may vary in configuration, including hardware and/or software configuration. The configuration of a computing resource may include its instance type, hardware capabilities (e.g., type and number of processor cores, type and amount of memory and storage, presence or absence of specialized coprocessors such as a graphics processing unit (GPU), and so on), software configuration (e.g., operating system type and configuration, virtualized execution environment type and configuration, application type and configuration, and so on), and/or other suitable characteristics. For example, the provider network may include a set of compute instances (physical compute instances and/or virtual compute instances) of different compute instance types, where the compute instance types may vary in computational characteristics and/or memory characteristics, potentially including the capabilities and features of their processor resources, memory resources, storage resources, network resources, and so on. The configuration of a computing resource may impact the performance of that resource for executing a particular task, such that resources having different configurations may vary in performance (e.g., processor performance, execution time, memory usage, storage usage, network usage, energy usage, and so on) for the same or similar tasks. The resources offered by the provider network may also vary in their respective costs that are assessed to clients for reserving and/or using the resources. Additionally, the resources offered by the provider network may vary in their availability at particular times.

As shown in 610, a job definition may be received, e.g., from a client by the compute environment management system. The job definition may specify or reference one or more tasks to be performed by computing resources in the provider network. The tasks within a job definition may include entirely different tasks (e.g., tasks having different program code) and/or tasks that run the same program code for different input data. For a particular task, a job definition may include or reference program instructions to be executed in processing the task. The job definition may include or be associated with a job identifier. The job definition may include or reference a set of input data to be processed using the program instructions, potentially using multiple copies of an application or set of program code to process different elements of the input data sequentially or concurrently. The job definition may also include or be provided with other suitable metadata, including timing information (e.g., a time to begin processing the workload, an anticipated time to run the workload, and/or a deadline), budgetary information, anticipated resource usage, and so on. For example, the anticipated resource usage in a job definition may indicate one or more values (including a range of values) for recommended or required processor usage (e.g., a number of virtual CPUs), memory usage, storage usage, network usage, and/or other hardware resource characteristics.

The job definition may be intended to be executed without delay or at a future point in time, e.g., based on a client-specified schedule. In one embodiment, the operations shown in 620 through 660 for task-level optimization may be performed without delay upon receiving a job definition and/or prior to executing the corresponding task(s) for the first time. In one embodiment, the job definition may represent an existing job definition whose task(s) have previously been executed in the provider network, and the operations shown in 620 through 660 may be performed to optimize the old, existing job definition. In one embodiment, the operations shown in 620 through 660 for task-level optimization may be performed with prior approval by the client who submitted the job definition. In one embodiment, the operations shown in 620 through 660 for task-level optimization may be performed automatically and without a need for prior approval by the client who submitted the job definition.

As shown in 620, computing resources that vary in configuration may be selected from the provider network for execution of the task(s). The selected computing resources may be provisioned from the provider network (e.g., using a component such as a resource manager) and placed in one or more compute environments associated with the client. In one embodiment, each type of configuration may be isolated in its own compute environment. However, it is also contemplated that a compute environment may include more than one type of resource configuration, e.g., compute instances of more than one instance type. For optimization of one or more particular task(s), computing resources having particular configurations may be selected, such as compute instances of particular instance types and/or software configurations with particular parameter values. In one embodiment, the particular configurations may be selected based (at least in part) on input from the client, such as a list of instance types that are usable within a compute environment or a list of instance types on which a task is to be tested for optimization purposes. In one embodiment, the particular configurations may be selected without input from a client, e.g., automatically and/or programmatically by one or more components of the compute environment management system. Particular configurations may be selected based on job definitions. For example, if a job definition indicates that a particular number of virtual CPUs is required for a task, or a particular amount of memory is required, then only computing resources that meet or exceed such requirements may be selected in one embodiment.

As shown in 630, execution of the task(s) may be initiated using the computing resources selected in 620. Initiating the execution of a task may include the compute environment management system interacting with a resource manager to provision, configure, and launch one or more compute instances to run the task. Provisioning a resource may include reserving, configuring, and/or launching the resource. In a multi-tenant provider network, a compute instance may represent a virtual compute instance running on a physical compute instance, and the physical compute instance may be selected from a set of different instance types having different configurations or capabilities and potentially a different fee structure for usage. Each instance may be used for one or more tasks in the workload and then deprovisioned or reconfigured for use by the same client. In one embodiment, a container management system may be used with the virtual compute instances to deploy the program instructions supplied or otherwise referenced by the client. For example, the provisioned instance may be launched using a machine image that includes a container management system. In various embodiments, the instance may be launched before the task is scheduled or in response to the scheduling of the job. After launch, a container may be filled with the program instructions indicated by the client for performing the task. In one embodiment, tasks may also represent programs (and potentially input data) submitted to a program execution service that manages its own fleet of compute instances. The execution of the task(s) may represent consecutive and/or concurrent execution of multiple tasks or copies of tasks, often using multiple compute instances or other computing resources operating in parallel. In one embodiment, output associated with the task(s) may be returned to the client.

As shown in 640, the execution of the task(s) may be monitored, and one or more metrics associated with the execution may be generated. The metrics may relate to the performance of the execution. For example, the metrics may include one or more metrics related to processor usage, one or more metrics related to execution time, one or more metrics related to memory usage, one or more metrics related to storage usage, one or more metrics related to network usage, one or more metrics related to energy usage, and so on. As another example, the metrics may include one or more metrics related to the cost of the execution, including aggregate costs across all computing resources, per-resource costs, costs per hour, total costs for the duration of the task(s), and so on. The metrics may be generated on any suitable basis, such as the execution monitoring (using any suitable techniques, such as agent software or other instrumentation of compute instances, the use of an external metric collection service, and so on) and/or any tables or references indicating resource costs. In one embodiment, the metrics may be supplied to the client at one or more appropriate points in time, e.g., in summarized form.

As shown in 650, it may be determined whether the execution of the task(s) has completed. The task(s) may be determined to be complete by a component such as a job scheduler, e.g., when the task(s) (or a sufficient number of copies thereof) have been scheduled for execution and have all exited (e.g., successfully or unsuccessfully). If the execution is not finished, the method may return to the operation shown in 640 for additional monitoring and generating of metrics. If the execution of a sufficient number of copies of the task(s) has occurred, then the method may proceed to the operation shown in 660 to complete the task-level optimization.

As shown in 660, a recommended configuration of computing resources may be determined for the task(s). The recommended configuration may be determined based (at least in part) on analysis of the metric(s) associated with the task execution. The recommended configuration may indicate one or more instance types for compute instances, a number or range of numbers of compute instances (per instance type or for all instance types), a hardware configuration for a compute instance (potentially including a number of cores, number of virtual CPUs, chipset, processor speed, bus speed, memory configuration, presence or absence of specialized coprocessors, and so on), one or more instance types for other types of resources, one or more number or ranges of numbers of other types of resources, one or more parameter values for operating system software, one or more parameter values for application software (e.g., an application used to perform the task(s)), one or more parameter values for execution environment software (e.g., a virtualized execution environment such as a virtual machine), any other suitable configuration values, and/or a combination thereof. The recommended configuration may include a configuration for which execution of the task(s) was tested in 630 and 640. The recommended configuration may include one value (e.g., a minimum or maximum) or a range of acceptable values (e.g., within a minimum and maximum) for a particular hardware characteristic (e.g., number of virtual CPUs) or software parameter.

In one embodiment, the recommended configuration may be determined to optimize for one or more goals, such as one or more cost goals and/or one or more performance goals. The optimization goals may be determined based on input from a client, based on system defaults, or on any other suitable basis. For example, a client may seek to optimize a task primarily for execution time but secondarily for cost. Based on the metrics generated in 640, the various resource configurations may be ranked by execution time. For configurations with the shortest execution time, one or more of the least expensive configurations may be recommended for that task. Any suitable combination and priority of optimization goals may be used to determine one or more recommended configurations. The recommended configuration may also be referred to as an optimal or optimized configuration. As used herein, terms such as "optimization," "optimize," "optimized," and "optimal" generally refer to a process of improvement in one or more characteristics and not necessarily to reaching a perfect or ideal state. As will be discussed below with respect to FIG. 8, a compute environment may be provisioned with one or more computing resources consistent with the recommended configuration and used for further execution of the task(s).

In one embodiment, a compute instance or other resource may be automatically deprovisioned and/or returned to the pool of available computing resources upon completion (e.g., successful or unsuccessful termination) of the task(s) or otherwise when the compute environment management system determines that the instance is no longer needed in a compute environment. Deprovisioning may include terminating and returning the compute instance to the pool of available resources of a provider network, e.g., as managed by the resource manager. Deprovisioned instances may be used in the future by the same client or by one or more different clients. In one embodiment, compute instances may be deprovisioned and/or removed automatically (e.g., without direct input from a user) and programmatically (e.g., by execution of program instructions) by the compute environment management system.

Figure 8:
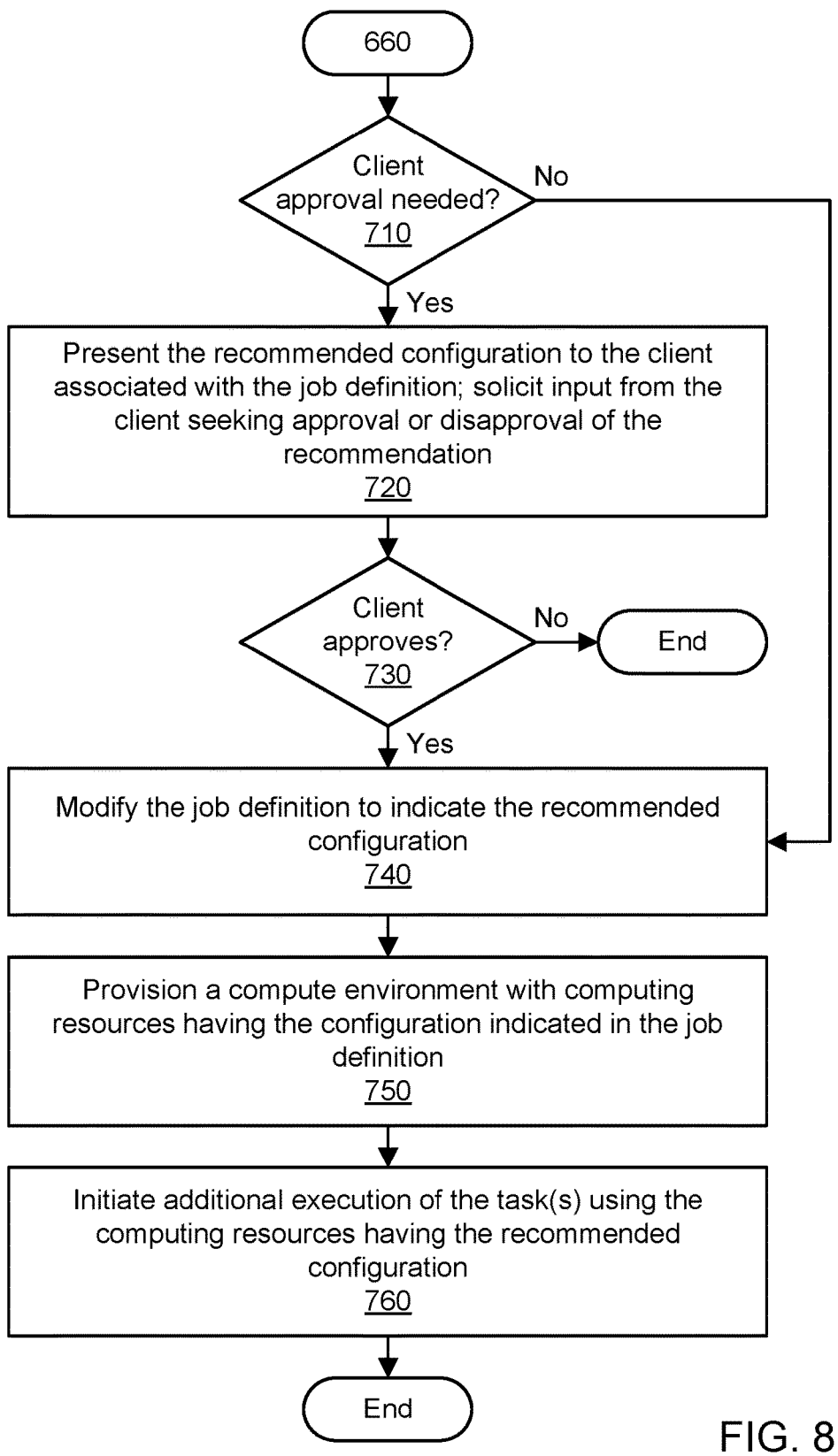
FIG. 8 is a flowchart illustrating further aspects of a method for task-level optimization with compute environments, including provisioning of an optimal compute environment either automatically or with client approval, according to one embodiment.

FIG. 8 is a flowchart illustrating further aspects of a method for task-level optimization with compute environments, including provisioning of an optimal compute environment either automatically or with client approval, according to one embodiment. The operations shown in FIG. 8 may be performed after the operation shown in 660. As shown in 710, it may be determined whether client approval is needed with respect to the recommended configuration, e.g., to deploy resources having the recommended configuration for execution of the task in the future. If so, then as shown in 720, the recommended configuration may be presented to the client through any appropriate interface(s), e.g., in a management console. Input from the client may be solicited seeking approval or disapproval of the recommended configuration. In one embodiment, multiple configurations or a range of configuration values may be presented, and input from the client may be solicited to select one or more of those configurations or values. The input may also be solicited through any appropriate interface(s), e.g., in a management console.

As shown in 730, if the client does not approve, then no further action may be taken with regard to the recommendation. Alternatively, the testing process shown in FIG. 7 may be repeated, but the range of configurations may be altered, e.g., to remove the recommended configuration and seek a different configuration. In one embodiment, the client may instead manually craft an optimal configuration using the summary of metrics and/or recommended presentation report.

As shown in 740, either automatically or with approval from the client, a job definition associated with the task(s) may be programmatically modified to indicate aspects of the recommended configuration. For example, the anticipated or recommended resource usage in the job definition may be updated to indicate one or more new values (including a range of values) for anticipated processor usage (e.g., a number of virtual CPUs), memory usage, storage usage, network usage, and/or other hardware resource characteristics. As another example, one or more parameter values associated with a software configuration may be modified in the job definition. The software configuration may relate to parameter values for an application itself, the parameter values for a container that is used to execute the application, the parameter values for an execution environment such as a virtual machine, and so on.

As shown in 750, a compute environment may be provisioned with one or more computing resources consistent with the recommended configuration indicated in the modified job definition. As shown in 760, the compute environment may be used for further execution of the task(s), e.g., to execute additional copies of the task(s), potentially with new input data. In one embodiment, the operations shown in 750 and 760 may be performed only after the client has indicated that the task(s) should be performed, e.g., by supplying new input data for the task(s). In one embodiment, the operations shown in 750 and 760 may be performed only after a scheduled time is reached for the task(s). In this manner, additional execution of the task(s) may be performed in a compute environment that has been optimized based (at least in part) on testing of the task(s) with multiple resource configurations.

In one embodiment, the job definition indicating the task(s) may define an array job. The testing procedures shown in FIG. 7 may be performed for a first portion of the array job, and the operations shown in 740 through 760 may be performed for a second portion of the array job, including automatic modification of the job definition for the array job to indicate a change in a recommended or required resource configuration. Thus a configuration of the computing resources used for the execution of the array job may be dynamically adjusted for a later portion of the array job based (at least in part) on one or more metrics associated with an earlier portion of the array job.

Illustrative Computer System

In at least some embodiments, a computer system that implements a portion or all of one or more of the technologies described herein may include a computer system that includes or is configured to access one or more computer-readable media. FIG. 9 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a pool of available computing resources of a multi-tenant provider network; and
one or more computing devices having at least one processor and a memory configured to implement a compute environment management system, wherein the compute environment management system is configured to:
receive a job definition defining an array job comprising a first set of one or more tasks and a second set of one or more tasks;
select, a plurality of available computing resources in the pool for execution of the first set of one or more tasks, wherein the plurality of available computing resources comprise a plurality of different hardware configurations;
initiate execution of the first set of one or more tasks using the selected plurality of available computing resources from the pool;
monitor the execution of the first set of one or more tasks by the plurality of different hardware configurations;
generate one or more performance metrics based at least in part on the monitoring of the execution of the first set of one or more tasks;
select one or more recommended hardware configurations from the plurality of different hardware configurations based at least in part on the generated one or more performance metrics;
modify the job definition to indicate the selected one or more recommended hardware configurations;
provision a compute environment based at least in part on the modified job definition, wherein the compute environment comprises a plurality of additional available computing resources from the pool having the indicated one or more recommended hardware configurations; and
initiate execution of the second set of one or more tasks across the compute environment according to the modified job definition such that the second set of one or more of the tasks is executed by the plurality of additional available computing resources having the indicated one or more recommended hardware configurations.

2. The system as recited in claim 1, wherein the compute environment management system is further configured to:
generate a recommendation indicating the one or more recommended hardware configurations; and
solicit user input approving or declining the recommendation.

3. The system as recited in claim 1, wherein the compute environment management system is further configured to:
determine at least some of the hardware configurations used for the execution of the first set of one or more tasks based at least in part on the job definition.

4. The system as recited in claim 1, wherein the compute environment management system is further configured to:
select the one or more recommended hardware configurations to optimize the system for cost or performance.

5. A computer-implemented method executed by a compute system having at least one processor and a memory, the method comprising:

receiving a job definition defining an array job comprising a first set of one or more tasks and a second set of one or more tasks;

initiating execution of the first set of one or more tasks on a plurality of different types of available computing resources provisioned from a pool of available computing resources of a multi-tenant provider network, wherein at least some of the different types of available computing resources initiated to execute the first set of one or more tasks vary in configuration;

determining one or more metrics that are based on the execution of the first set of one or more tasks by the plurality of different types of available computing resources;

selecting a configuration of the varied configurations of the plurality of different types of the available computing resources based at least in part on the determined one or more metrics;

generating a modified job definition associated with the second set of one or more tasks, wherein the modified job definition indicates the selected configuration;

provisioning, based at least in part on the modified job definition, a compute environment that comprises one or more additional available computing resources from the pool having the indicated configuration; and initiating execution of the second set of one or more tasks across the compute environment according to the modified job definition such that the second set of one or more of the tasks is executed by the one or more additional available computing resources having the indicated configuration.

6. The method as recited in claim 5, further comprising:
generating a hardware configuration recommendation based at least in part on the determined one or more metrics, wherein the selected configuration is determined based at least in part on user input indicating acceptance of the hardware configuration recommendation.

7. The method as recited in claim 5, further comprising:
determining at least some of the plurality of different types of available computing resources used for the execution of the first set of one or more tasks based at least in part on the job definition.

8. The method as recited in claim 5, wherein:
the determined one or more metrics comprise one or more cost metrics associated with a cost of executing the plurality of different types of available computing resources, and
said selecting the configuration of the varied configurations of the plurality of different types of available computing resources comprises selecting the configuration to optimize for the cost of executing the plurality of different types of available computing resources.

9. The method as recited in claim 5, wherein:
the determined one or more metrics comprise one or more metrics associated with performance of the plurality of different types of available computing resources that execute the first set of one or more tasks, and
said selecting the configuration of the varied configurations of the plurality of different types of available computing resources comprises selecting the configuration of the plurality of different types of available computing resources to optimize for performance of the plurality of different types of available computing resources.

10. The method as recited in claim 5, further comprising:
varying configuration parameter values for at least some of a plurality of instances of an application, wherein the execution of the first set of one or more tasks using the plurality of different types of available computing resources comprises execution of the plurality of instances of the application using the plurality of different types of available computing resources.

11. The method as recited in claim 5, wherein the selected configuration indicated in the modified job definition comprises one or more hardware characteristics of the one or more additional available computing resources.

12. The method as recited in claim 5, wherein the selected configuration indicated in the modified job definition comprises one or more software parameter values for application software that is executed to execute the second set of one or more tasks.

13. A non-transitory computer-readable storage medium storing computer-executable program instructions that when executed by one or more processors perform:
receiving a job definition defining an array job comprising a first set of one or more tasks and a second set of one or more tasks;

initiating execution of the first set of one or more tasks using a plurality of different types of available computing resources provisioned from a pool of available computing resources of a multi-tenant provider network, wherein at least some of the different types of available computing resources initiated to execute the first set of one or more tasks vary in computational or memory characteristics;

determining one or more metrics based on the execution of the first set of one or more tasks by the plurality of different types of available computing resources;

selecting a configuration of the varied computational or memory characteristics of the plurality of different types of available computing resources based at least in part on the determined one or more metrics;

generating a modified job definition associated with the second set of one or more tasks, wherein the modified job definition indicates the selected configuration;

provisioning, based at least in part on the modified job definition, a compute environment that comprises one or more additional available computing resources from the pool having the selected configuration indicated by the modified job definition; and initiating execution of the second set of one or more tasks across the compute environment according to the modified job definition such that the second set of one or more tasks is executed by the one or more additional available computing resources having the indicated configuration.

14. The non-transitory computer-readable storage medium as recited in claim 13, wherein the determined one or more metrics comprise one or more metrics associated with a cost or performance of the plurality of different types of available computing resources that execute the first set of one or more tasks, and wherein the selected configuration is selected to optimize for the cost or performance.

15. The non-transitory computer-readable storage medium as recited in claim 13,
wherein the multi-tenant provider network comprises a plurality of hardware configurations varying in computational or memory characteristics, and
wherein the selected configuration comprises a selection of one or more of the hardware configurations that vary in the computational or memory characteristics.

* * * * *